(12) United States Patent
Hoss et al.

(10) Patent No.: US 11,022,143 B2
(45) Date of Patent: Jun. 1, 2021

(54) FAN HOUSING HAVING A HEATING BAND CHANNEL

(71) Applicant: ebm-papst Mulfingen GmbH & Co. KG, Mulfingen (DE)

(72) Inventors: Sebastian Hoss, Bad Mergentheim (DE); Oliver Haaf, Kupferzell (DE)

(73) Assignee: ebm-papst Mulfingen GmbH & Co. KG, Mulfingen (DE)

( * ) Notice: Subject to any disclaimer, the term of this patent is extended or adjusted under 35 U.S.C. 154(b) by 268 days.

(21) Appl. No.: 15/556,434

(22) PCT Filed: Mar. 3, 2016

(86) PCT No.: PCT/EP2016/054577
§ 371 (c)(1),
(2) Date: Sep. 7, 2017

(87) PCT Pub. No.: WO2016/142275
PCT Pub. Date: Sep. 15, 2016

(65) Prior Publication Data
US 2018/0106269 A1  Apr. 19, 2018

(30) Foreign Application Priority Data

Mar. 10, 2015 (DE) .................. 10 2015 103 499

(51) Int. Cl.
*F04D 29/52* (2006.01)
*F04D 19/00* (2006.01)
(Continued)

(52) U.S. Cl.
CPC ............. *F04D 29/526* (2013.01); *F01M 1/10* (2013.01); *F01M 1/16* (2013.01); *F01M 5/00* (2013.01);
(Continued)

(58) Field of Classification Search
CPC ..... F04D 29/522; F04D 29/526; F04D 29/646; F04D 29/582; F04D 29/584;
(Continued)

(56) References Cited

U.S. PATENT DOCUMENTS

2009/0180872 A1* 7/2009 Lundgren ............. F01D 25/145
415/215.1
2011/0150632 A1* 6/2011 Heli ..................... B01D 46/001
415/121.2
(Continued)

FOREIGN PATENT DOCUMENTS

DE    102012109544 A1   4/2014

OTHER PUBLICATIONS

International Search Report (in German with English Translation) for PCT/EP2016/054577, dated May 30, 2016; ISA/EP.

*Primary Examiner* — Michael Lebentritt
*Assistant Examiner* — Jesse M Prager
(74) *Attorney, Agent, or Firm* — Harness, Dickey & Pierce, P.L.C.

(57) ABSTRACT

A fan housing includes a housing body for accommodating fan components and an outer casing which surrounds the housing body in circumferential direction. The housing body has at least two webs extending in a circumferential direction on the radial outer side. The outer casing has at least two ribs extending in the circumferential direction on the radial inner side. The ribs, in the assembled state, between the housing body and the outer casing, form a channel circulating in the circumferential direction for receiving and holding a heating band. The outer casing has at least one guiding rib directed in the radial direction toward a housing body as well as into the channel and extending in the circumferential direction.

7 Claims, 2 Drawing Sheets

Figure 1:
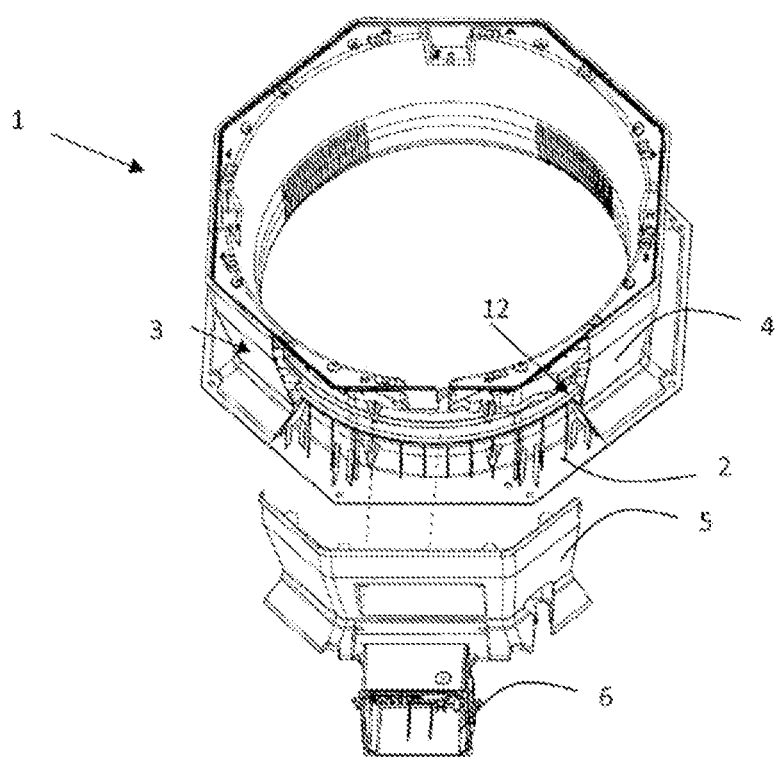

(51) Int. Cl.
      *F04D 29/58*       (2006.01)
      *F04D 29/64*       (2006.01)
      *F01M 1/10*        (2006.01)
      *F01M 1/16*        (2006.01)
      *F01M 5/00*        (2006.01)
      *F02B 37/18*       (2006.01)
      *F16H 57/04*       (2010.01)
      *F16K 11/02*       (2006.01)
      *F16N 29/02*       (2006.01)
      *F04D 25/02*       (2006.01)

(52) U.S. Cl.
CPC ........... *F01M 5/007* (2013.01); *F02B 37/183* (2013.01); *F04D 19/002* (2013.01); *F04D 29/522* (2013.01); *F04D 29/582* (2013.01); *F04D 29/584* (2013.01); *F04D 29/646* (2013.01); *F16H 57/0434* (2013.01); *F16K 11/02* (2013.01); *F16N 29/02* (2013.01); *F01M 2001/1092* (2013.01); *F04D 25/02* (2013.01); *F16N 2200/10* (2013.01)

(58) Field of Classification Search
CPC ............. F04D 29/4226; F04D 29/5853; F04D 19/002; F04D 25/02
USPC ....................................................... 415/214.1
See application file for complete search history.

(56) References Cited

U.S. PATENT DOCUMENTS

2012/0051889 A1     3/2012    Gamissans Bou et al.
2015/0345509 A1    12/2015    Best et al.

\* cited by examiner

FAN HOUSING HAVING A HEATING BAND CHANNEL

FIELD

The disclosure relates to a fan housing having a housing body for accommodating fan components, including in particular a heating band.

The disclosure further relates to a fan assembly having such a fan housing.

BACKGROUND

From the prior art, fan housings and wall rings for fans of a great variety of different designs are known. For use in cold applications, in which there is a risk of icing, for example, in the patent application DE 10 2012 109 544 A1 of the applicant, a heater in the form of a wall ring heater on the wall ring is disclosed.

In practice, the solution known from the prior art works very well, but the installation of the heating band requires removal of the casing, particularly if the latter is not round. Retrofitting of a heating band, for example, in the assembled state at the site of use, is possible only at increased cost or only after disassembly.

SUMMARY

The underlying aim of the disclosure therefore is to provide a fan housing which, on the outer side thereof, can be provided with a heating band both at the time of first assembly and for retrofitting, without having to remove the entire outer casing. Furthermore, use of outer casings of different shapes, for example, in the form of a hexagon or an octagon viewed from the top, should be made possible.

Here, proposed according to the disclosure is a fan housing with a housing body for accommodating fan components and an outer casing which surrounds the housing body in circumferential direction, wherein the housing body has at least two webs extending in circumferential direction on the radial outer side thereof, and/or the outer casing has at least two ribs extending in circumferential direction on the radial inner side thereof, which ribs, in the assembled state, between the housing body and the outer casing, form a channel circulating in circumferential direction for receiving and holding a heating band. The outer casing has at least one guiding rib directed in the radial direction toward the housing body as well as into the channel and extending in circumferential direction. Due to the use of a guiding rib, the heating band can be inserted into the channel between housing body and outer casing in circumferential direction, without having to remove the entire outer casing. The guiding rib ensures the guiding of the heating band in circumferential direction, in order to prevent jamming within the channel. In particular, in the case of non-round outer casings, the interior of the channel comprises edges on which, the heating band, without at least one guiding rib, could become caught and thus could not be inserted further.

In an advantageous embodiment, the housing body can be designed as a wall ring of an axial fan.

In an advantageous embodiment, it is provided that the outer casing consists of at least two segments, wherein at least one of the segments is detachably fastened on the housing body and provides access to the channel. The use of individual segments provides access to the channel after the removal of only one of the segments, without having to remove the rest of the outer casing. For retrofitting or replacement of the heating band, only the one detachable segment is removed, and the heating band is inserted or replaced. Then, the segment is assembled again. The fastening of the segment here occurs advantageously by means of a clamping or clip-on connection.

The number of segments can be set as desired, and, in the case of a polygonal design of the outer casing, for example, it can correspond to the number of corners, for example. However, an advantageous embodiment variant of the disclosure is characterized in that the outer casing consists of exactly two segments, wherein one of the segments is fastened detachably to the housing body, and the detachable segment takes up ⅓ to ⅛ of the circumference of the outer casing. This means that most of the outer casing can be fastened to the housing body, and only a relatively small segment needs to be removed in order to insert the heating band into the channel or replace it. This can be managed very easily.

Furthermore, in an advantageous embodiment variant, the at least one guiding rib of the outer casing is formed in each case on the inner sides of the segments and, on segment edges directed in circumferential direction, they abut against one another on abutting edges, wherein the radial and axial abutting edge extends flush in circumferential direction. When an outer casing formed by segments is used, the result, on the adjoining segment edges, in each case is an abutment of the at least one guiding rib. In order to prevent a jamming of the heating band at the abutment, the guiding rib extending in circumferential direction extends from segment to segment advantageously flush axially and in particular radially.

In another advantageous alternative embodiment, it is provided that the abutting edge of the guiding rib, which in each case is formed between the segments, comprises a radial step in circumferential direction in each case. The radial step is formed, in a circumferential direction, predetermined as insertion direction, in such a manner that it always is directed radially outward. The step is achieved in that the respective section of the guiding rib adjoining in circumferential direction is formed on the adjoining segment so as to be radially shorter and protrude less far into the channel. When the heating band is inserted in circumferential direction, the front end of the heating band slides along the inner side of the outer casing and the at least one guiding rib. As a result of the respective radially outward step on the at least one guiding rib, a jamming of the heating band on the abutting edges between the segments is avoided.

In a development, it is provided that the housing body has, on the radial outer side thereof, at least in sections, axial guiding limbs, the radial outer edge of which extends at a slant radially inward and thereby in the direction of a section forming the channel in the assembled state. The guiding limbs directed toward or even into the channel allow a blind feeding of the heating band into the channel. This is advantageous, for example, in the equipping of the heating band in the state in which it is assembled at the site of use (including, for example, in the case of assembly on a ceiling), and where the feed site is not visible. For the assembly, the front end of the heating band, which is to be inserted, can be set along the guiding limbs up to the insertion opening of the channel and then inserted in circumferential direction into the channel.

In an advantageous design, the webs and/or the ribs are formed in such a manner that they sufficiently cover a conventionally inserted heating band in radial direction, in order to form, in circumferential direction, an axial guide for the insertion of a heating band. The webs and ribs can here work together and abut in radial direction or overlap with slight offset. The scope of the disclosure also includes that only webs or only ribs are provided, which are in each case dimensioned sufficiently large in radial direction that they come in contact with the outer casing or the housing body.

The disclosure further comprises the entire fan assembly with a motor, an impeller, and, if desired, a protective grate. The fan assembly comprises the above-described fan housing surrounding the impeller.

All the features disclosed can be combined in any desired manner, to the extent technically feasible.

Other advantageous developments of the disclosure are represented below together with the description of the preferred embodiment of the disclosure in reference to the figures.

FIGURES

Figure 2:
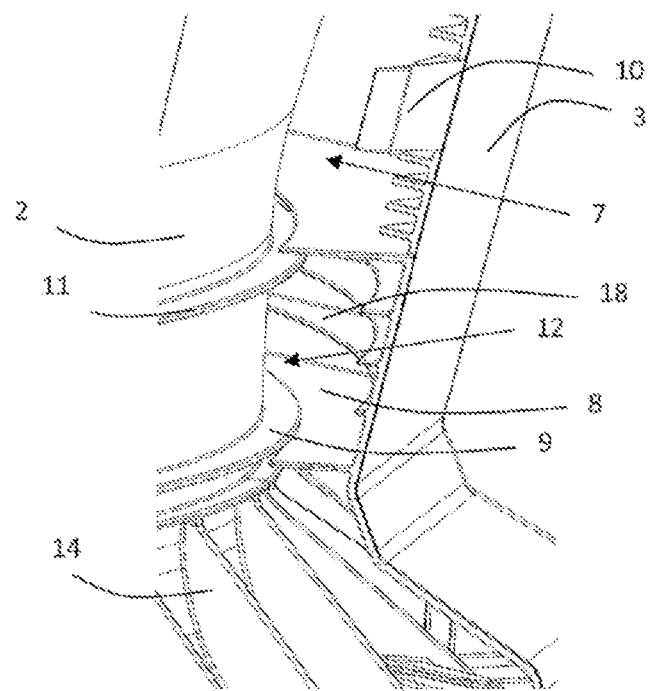
Figure 3:
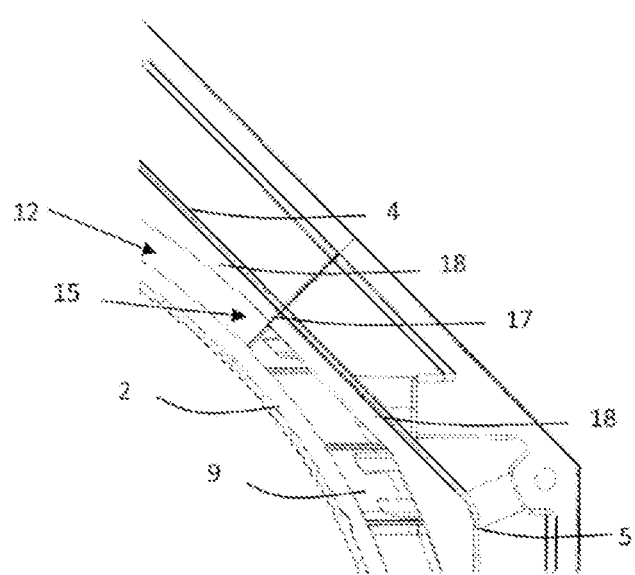

FIG. 1 an exploded perspective view of a fan housing;
FIG. 2 a partially exploded side view of the fan housing from FIG. 1;
FIG. 3 a top view into the channel of the fan housing from FIG. 1.

The figures are diagrammatic examples and used for a better understanding of the features according to the disclosure, wherein the above-described features are not all represented, but can be implemented nonetheless, such as, for example, an antibacterial coating.

In FIG. 1, an octagonal housing 1 of an axial fan for use in cooling applications is represented in a partially exploded perspective view. The housing 1 is formed by a housing body 2 formed as a wall ring, within which the impeller (not shown) of the fan rotates, and by an outer casing 3 arranged on the radial outer side of the housing body 2 and enclosing the housing body 2 extensively in circumferential direction. The radial outer surface of the housing 2 is formed entirely by the outer surface of the outer casing 3. The contour thereof is smooth, substantially free of edges, and formed without undercuts, in order to offer no possibilities for adhesion or collection of dirt particles.

In the embodiment example shown, the outer casing 3 is formed by the segments 4, 5 which are fastened to one another by the hooks 10 shown in detail in FIG. 2. In the assembled state, the segments 4, 5 form a flush transition with respect to one another without recesses or slots. In FIG. 1, it is shown, as an example, that the segment 5 with the electrical connection 6 formed thereon has been disassembled. In this embodiment, the other segment 4 forms a single part, but it can also be subdivided into more parts for a specialized application and optimized manufacturing. The outer casing 3 or respectively the segments 4, 5 is/are detachably fastened via clip-on connections to the housing body 2 or to one another.

The detachable segment 5 takes up ¼ of the circumference of the outer casing 3. Therefore, it can be easily removed for the assembly of the heating band, which is not represented to simplify the view, and fastened again after the heating band has been inserted. After the disassembly of the segment 5, the channel 12 is partially free, in order to provide an insertion opening for the heating band. Preferably, an insertion direction in a predetermined circumferential direction is established.

FIG. 2 shows the housing 1 from FIG. 1 in a side view, wherein in each case only one side of the fan 1 is shown. But the opposite side is an identical mirror image. The outer casing 3 is arranged apart from the housing body 2, so that, between the two components, a completely circumferential hollow space 7 in circumferential direction is formed. On the housing body 2, webs 9, 11 extending in circumferential direction and radially outward are formed. The webs 9, 11 work together with ribs 7, 8 formed on the outer casing 3 in order to form a channel 12 which is completely circumferential in circumferential direction and into which the heating band can be laid in a fixed position. On the outer casing 3, multiply axially spaced guiding ribs 18 are formed, which are directed in radial direction toward the housing body 2 as well as into the channel 12 and which extend in circumferential direction. The inner contour of the guiding ribs 18 corresponds substantially to the outer contour of the housing body 2, wherein the radial extension of the guiding ribs 18 compensates for the angular shape of the outer casing 3, in order to ensure a substantially circumferential round channel 12. In the area of the segment 5, on the housing body 2, radially external axial guiding limbs 14 are formed, the radial outer edges of which extend at a slant radially inward and thereby in the direction of the channel 12. The heating band, not shown, can be placed on the guiding limbs 14 and inserted into the channel 12 first in axial direction until it is positioned with the front end thereof within the webs 9, 11, i.e., within the channel 12, wherein it is then inserted further in circumferential direction along the channel 12 until it completely surrounds the housing body 2.

FIG. 3 shows a top view of a transition between the segments 4, 5 and into the channel 12 of the fan housing 1 from FIG. 1. The segments 4, 5 and the sections of the guiding ribs 18 formed thereon in each case abut against one another and form an abutting edge 17. On the abutting edge 17, the guiding ribs 18 comprise a radially outward directed step 15, so that, when the heating band is pushed through the channel 12, it does not catch on the abutting edge 17. Although FIG. 3 shows only one transition between two segments 4, 5, according to the disclosure each additional transition between successive segments is formed accordingly.

The implementation of the disclosure is not limited to the above indicated preferred embodiment examples. Rather, numerous variants are conceivable, which use the represented solution, including in designs of fundamentally different type. For example, instead of several guiding ribs, an axially broader, preferably interiorly hollow guiding wall can be provided, along which the heating band can slide.

The invention claimed is:
1. A fan housing comprising:
a housing body for accommodating fan components and
an outer casing surrounds the housing body in a circumferential direction, the outer casing includes at least two segments, one of the segments is detachably fastened to the housing body and the detachable segment takes up ⅓ to ⅛ of the circumference of the outer casing, wherein
the housing body has at least two webs extending in the circumferential direction on a radial outer side of the housing body, and/or the outer casing has at least two ribs extending in the circumferential direction on a radial inner side of the outer casing, the ribs, in the assembled state, between the housing body and the outer casing, form a channel circulating in circumferential direction for receiving and holding a heating band, and
the outer casing has at least one guiding rib spaced from and directed in the radial direction toward the housing body, as the at least one guiding rib is radially directed into the channel and the at least one guiding rib extending in the circumferential direction, the at least one guiding rib defining an outer extent of the channel so that the heating band is positioned between the housing body and the at least one guiding rib as the heating band is inserted into the channel, the heating band is guided by the at least one rib as the heating band is inserted into the channel and the at least one guiding rib contacts the heating band and the detachable segment is removable and after the removal of only the detachable segment, the heating band can be inserted in the circumferential direction into the channel over the entire circumference.

2. The fan housing according to claim 1, wherein the at least one guiding rib of the outer casing is formed on inner sides of the at least two segments and, on segment edges directed in a circumferential direction, the at least two segments abut against one another on abutting edges, wherein a radial and axial abutting edge extends flush in the circumferential direction.

3. The fan housing according to claim 2, wherein the at least one guiding rib of the outer casing is formed on the inner sides of the at least two segments and they adjoin one another on segment edges directed in circumferential direction, wherein the at least one guiding rib of the at least two segments with the abutting edge is arranged in a mutually facing manner, and the abutting edge formed by the at least one guiding rib comprises in each case a radial step in the circumferential direction.

4. The fan housing according to claim 3, wherein, in a predetermined circumferential direction, the radial step of each segment edge of the at least one guiding rib is arranged between each of the at least two segments in a radial outward direction.

5. The fan housing according to claim 1, wherein the housing body comprises, on the radial outer side thereof, at least in sections, comprises axial guiding limbs, the radial outer edges of the axial guiding limbs extend at a slant radially inward and are directed in a direction of a section forming the channel in the assembled state.

6. The fan housing according to claim 1, wherein the webs and/or the ribs form an axial guide in the circumferential direction for insertion of a heating band.

7. A fan assembly with a motor and an impeller comprising the fan housing according to claim 1, wherein the fan housing surrounds an impeller.

* * * * *